Oct. 20, 1953
E. DUGAN
2,655,780
COTTON STRIPPER
Filed July 18, 1951
3 Sheets-Sheet 1
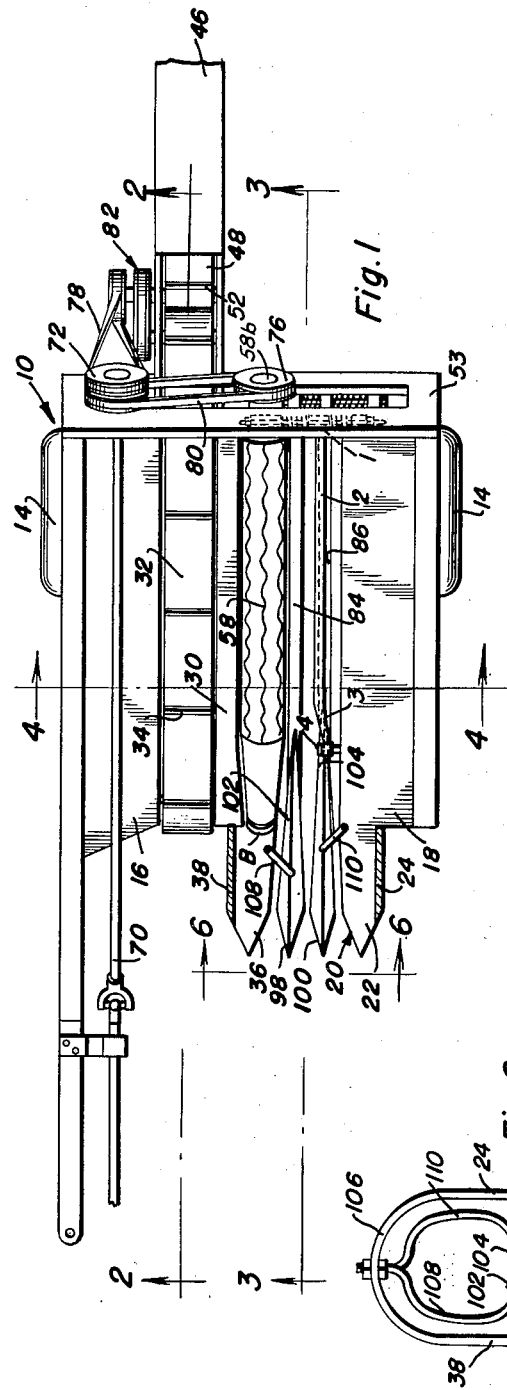
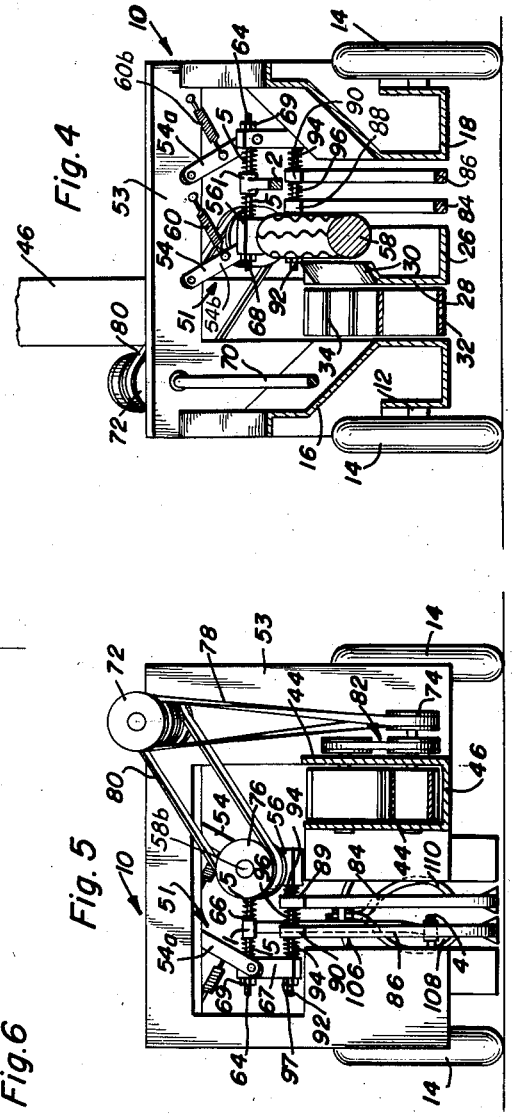
Edd Dugan
INVENTOR.
BY *Clarence A. O'Brien*
*and Harvey B. Jacobson*
Attorneys

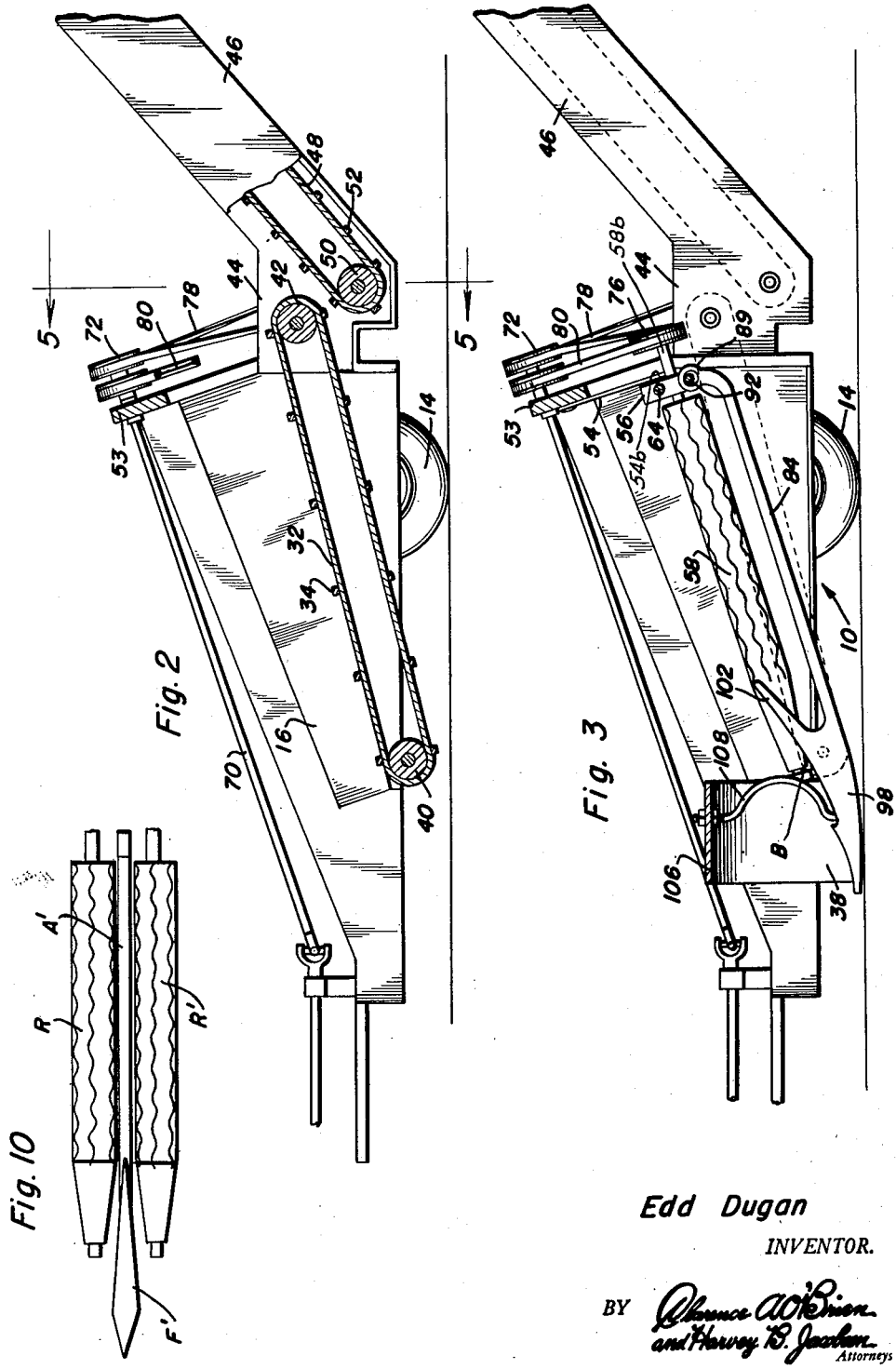

Oct. 20, 1953  E. DUGAN  2,655,780
COTTON STRIPPER
Filed July 18, 1951  3 Sheets-Sheet 3
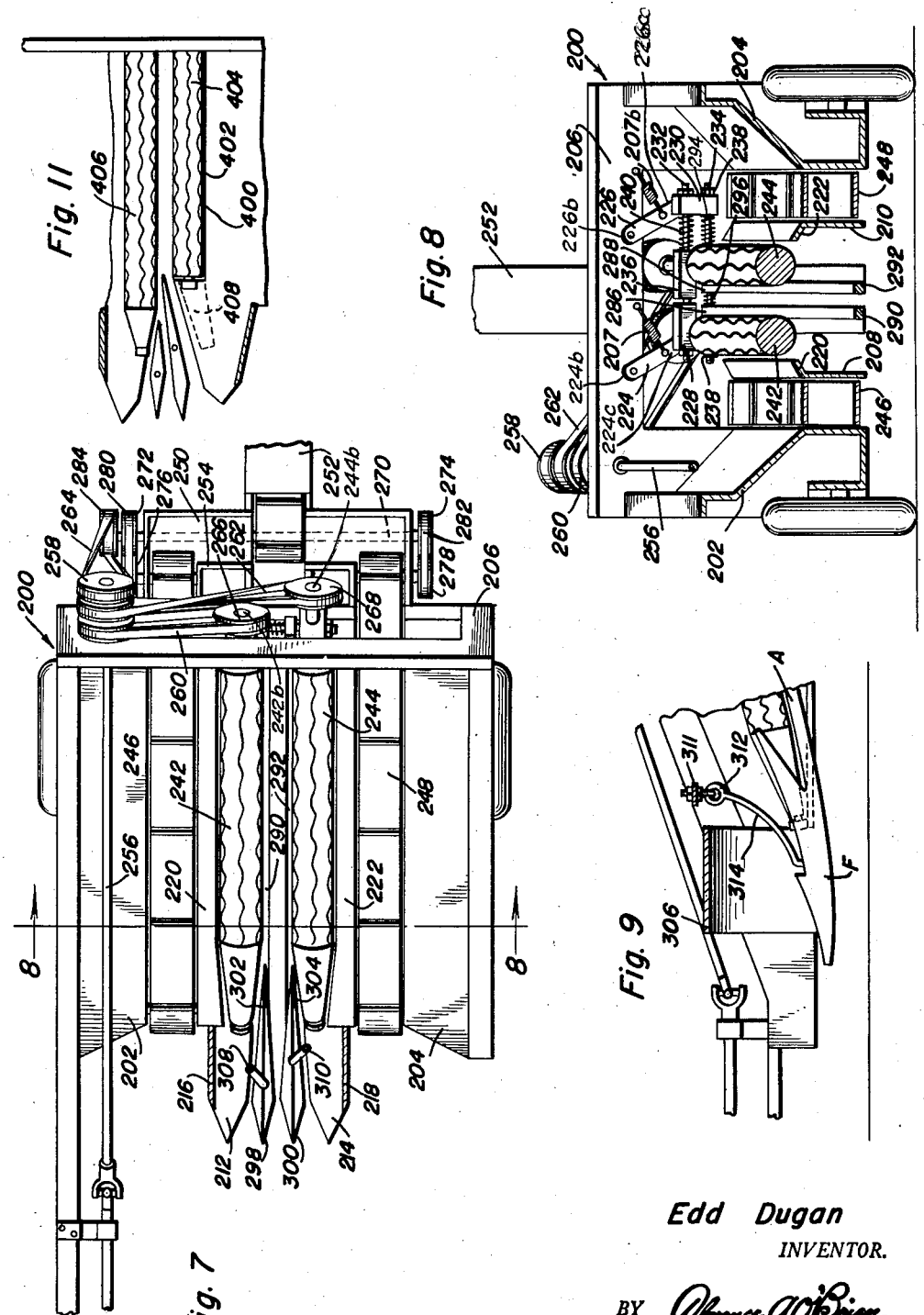
Edd Dugan
INVENTOR.
BY *Clarence A. O'Brien
and Harvey B. Jacobson*
Attorneys Patented Oct. 20, 1953

2,655,780

UNITED STATES PATENT OFFICE 2,655,780

COTTON STRIPPER

Edd Dugan, Davidson, Okla.

Application July 18, 1951, Serial No. 237,339

12 Claims. (Cl. 56—33)

This invention relates to new and useful improvements in cotton stripping machines and the primary object of the present invention is to provide a cotton harvester including one or more stripping rolls and a novel and improved means for lifting and guiding cotton plants toward the stripping rolls.

Another important object of the present invention is to provide an improved cotton boll stripper including a plurality of cotton plant lifting and guiding bars which are floatably suspended upon the wheeled frame of a harvester for guiding and lifting cotton plants toward the zone for stripping.

A further object of the present invention is to provide a cotton harvester of the single stripper roll or double roll type involving one or more swingable and slidable guide arms having forward ends that extend past the forward ends of the stripping rolls to effectively and efficiently guide cotton plants toward the stripping rolls as the harvester is moved over a row of plants.

A still further aim of the present invention is to provide a cotton row stripper that will remain upon a row of cotton and which will prevent cotton from rolling back out of the front of the machine as it does with conventional rollers and strippers.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention and showing the arch in section for the convenience of explanation;

Figure 2 is an enlarged longitudinal vertical sectional view taken substantially on the plane of section line 2—2 of Figure 1;

Figure 3 is a longitudinal vertical sectional view taken substantially on the plane of section line 3—3 of Figure 1;

Figure 4 is a transverse vertical sectional view taken substantially on the plane of section line 4—4 of Figure 1;

Figure 5 is a vertical section view taken substantially on the plane of section line 5—5 of Figure 2;

Figure 6 is an elevational view taken substantially on the plane of section line 6—6 of Figure 1;

Figure 7 is a top plan view in the present invention in slightly modified form and with the arch shown in section and with the swivel rods also shown in section for the convenience of explanation;

Figure 8 is a transverse vertical sectional view taken substantially on the plane of section line 8—8 of Figure 7;

Figure 9 is an enlarged fragmentary view of Figure 3 but showing the swivel rod in slightly modified form;

Figure 10 is a plan view showing the invention in modified form with a single guide finger and arm positioned between a pair of stripper rolls; and Figure 11 is a fragmentary plan view of the invention in further modified form and with parts shown in section.

Referring now to the drawings in detail, wherein for the purpose of illustration, there is disclosed a preferred embodiment of the present invention, the numeral 10 represents a frame that is supported on a driving axle 12 on the outer ends of which are journaled supporting wheels 14. The frame 10 is composed of two hollow side portions 16 and 18. The side portion 18 terminates in a forwardly extending ground hugging gatherer 20 that includes a forwardly tapering or pointed bottom wall or gathering shoe 22 and an outer vertical wall 24.

A vertically inclined member 26 forms a part of the frame and is supported between the side portions 16 and 18. The vertical wall 28 of the member 26 is provided with an inclined flange 30 at its upper end that forms a doffing flange. The space between the side portion 16 and the member 26 constitutes an initial assemblage zone for cotton stripped from their plants and has mounted therein an endless side conveyor 32 whose flights carry laterally spaced transverse cleats 34. The bottom wall of the member 26 terminates in a ground hugging gatherer having a point or gathering shoe 36 and an outer vertical wall 38.

The side conveyor 32 is supported for movement between the portion 16 and the member 26 by a lower, forward roller 40 and a rear, upper roller 42. As the roller 42 is spaced parallel to and above the roller 40, the side conveyor or endless belt 32 will be retained in a vertically inclined position as shown in Figure 2. The roller 42 is preferably formed with reduced ends that are rotatably supported in bearings (not shown) carried by the portion 16 and the member 26, whereas the reduced ends of the roller 42 are preferably rotatably supported in bearings (not shown) mounted on the forward, spaced parallel extensions 44 of an elevator trough 46.

The extensions 44 are suitably fixed to the frame 10 and in such a manner as to support the trough 46 in an upwardly and rearwardly inclined position as shown in Figures 2 and 3. The trough 46 houses an endless elevator belt 48 that is trained about rollers, such as 50, rotatably mounted in the trough. Cleats 52 are mounted on the belt 48 to increase the efficiency of the elevator belt in lifting cotton.

The rear portion of the belt 32 is disposed above the forward portion of the belt 48 so that cotton leaving the belt 32 will pass on to the belt 48 and the cotton is thus conducted to a disposal zone or truck disposed beneath the upper discharge end of the trough 46.

A stripper roll mount 51 is applied to the rear wall 53 of the casing member or frame 10 and consists of a pair of hanger straps 54 and 54a whose upper ends are pivoted to the wall 53. The lower end 54b of the strap 54 is pivoted to a bearing 56 that rotatably supports the reduced end 58b of a suitable stripper or stripping roll 58. Springs 60 and 60b connect the straps 54 and 54a to the wall 53 and urge the lower ends of the straps upwardly. An upper horizontal rod 64 is slidably supported by the bearing 56 and is also slidably supported by a bearing or block 67 pivoted to the lower apertured end of the strap 54a. A coil spring 66 surrounds the rod 62 and is biased between bearing 56 and the block 67 and urges the bearing 56 and the block 67 against nuts 68 and 69, respectively, that are threaded on the ends of rod 62. The nuts 68 and 69 are manually adjustable to permit longitudinal adjustment of the bearing 56 on the rod 62 and lateral adjustment of the roll 58 relative to the stripping bar 30.

A power driven shaft 70 is mounted on the frame 10 for rotation. One end of the shaft 70 is operatively connected to a prime mover or power take-off shaft and the other end of the shaft 70 carries a multiple pulley 72 that is connected to pulleys 74 and 76 by belts 78 and 80. The pulley 74 is mounted on the lower roller 50 of the elevator belt 48 and the pulley 76 is fixed on the reduced end of the roll 58. The lower roller of the elevator is connected to the upper roller of the side conveyor by a pulley belt and pulleys as indicated generally by the numeral 82 in Figures 1 and 5.

Means is provided for lifting and guiding plants toward the stripping roll 58 and this means consists of a pair of arms or dividers 84 and 86 whose rear eye ends 88 and 90 are slidably and swingably mounted on a rod 92 slidably and adjustably carried by the bearing 56 and the block 67. Relatively light springs 94 surround the rod 92 and are disposed between the eyes 88, 90 and the bearings 56, 67 and an additional relatively light coil spring 96 on the rod 92 biases the eyes 88 and 90 apart (Figure 5). Nuts 97 are threaded on the ends of the rod 92 and are manually adjustable for retaining the eyes 88 and 90 adjusted longitudinally upon the rod 92.

The forward ends of the arms 84 and 86 are integrally formed with enlarged fingers or guide members 98 and 100 that extend forwardly past the forward end of the roll 58. These guide members include upwardly and rearwardly inclined tapered portions 102 and 104 that extend rearwardly past the forward end of the roll 58 at an inclined angle with the roll. The rear end of the portion 104 extends rearwardly past the rear end of the portion 102 so that cotton on plants passing between the fingers 98 and 100 will not mingle with cotton or plants passing between finger 100 and portion 18 until the plants have cleared the forward end of the roll.

An arch 106 joins the outside vertical walls 24 and 38 of the portion 16 and the member 26, respectively. A pair of hanger members or curved swivel rods 108 and 110 include upper ends that are swiveled to the arch 106 and lower ends that are suitably fixed to the fingers 98 and 100 to support the fingers 98 and 100 above the ground and to permit swinging and lateral movement of the fingers.

In practical use of the present invention as thus described in Figures 1–6, inclusive, as the frame is pulled over the cultivated ground, the cotton plants will enter between the points 22 and 36; the fingers 98 and 100; or between finger 98 and point 36; or finger 100 and point 22. The plants are then lifted and guided by the fingers and the arms toward the stripping roller.

As the cotton is stripped from its plant by the roller 58 and the doffing flange 30, the cotton will fall upon the side conveyor and will be then directed upon the elevator where the cotton is disposed into a container, truck or the like.

Reference is now directed to Figures 7, 8 and 9, wherein the wheeled frame 200 includes two hollow side portions 202 and 204 that are joined at their rear ends by a wall 206. A pair of vertical walls 208 and 210 are suitably mounted between the side portions 202 and 204 and terminate in forwardly extending gatherers having lower pointed walls 212 and 214, and side walls 216 and 218. The upper edges of the walls 208 and 210 are bent inwardly to provide doffing flanges 220 and 222, as shown in Figure 8.

A stripper roll mount is attached to the wall 206 and consists of a pair of straps 224 and 226 whose upper ends 224b and 226b are pivoted to the wall 206. The straps 224 and 226 are connected by springs 207 and 207b to the wall 206. The lower end 224c of the strap 224 is pivoted to a bearing 228 and the lower end 226c of the strap 226 is pivoted to a block or bearing 230.

Upper and lower horizontal rods 232 and 234 are slidably carried by the bearing 228 and block 230, and an additional bearing 236 is slidably mounted on the rod 232. Nuts 238 are threaded on the ends of the rods 232 and 234. A coil spring 240 surrounds the upper rod 232 and is biased between the bearing 236 and the block 230.

Bearings 228 and 236 rotatably support the reduced ends 242b and 244b of a pair of stripper or stripping rolls 242 and 244 that parallel the flanges 220 and 222, and which coact with the flanges 220 and 222 in stripping cotton.

Vertically inclined side conveyors 246 and 248 are mounted between the side portions 202 and 204 and the vertical walls 208, 210 and lead to a transverse trough 250 at the rear of the frame. A vertically inclined elevator 252 is supported on the frame and its lower portion underlies a central slot 254 in the trough 250 to receive and elevate cotton passing through the slot 254.

A power driven shaft 256 is mounted on the frame and operatively connected to a power take-off shaft or power means at its forward end. The rear end of the shaft 256 supports a multiple pulley 258 about which there is trained pulley belts 260, 262 and 264. The belt 260 is trained about a pulley 266 on the rear end of the roll 242 and the belt 262 is trained about a pulley 268 on the rear end of the roll 244.

A shaft 270, attached to the lower drive roller of the elevator, is rotatably supported beneath the trough 250 and supports pulleys 272 and 274 that are connected to pulleys 276 and 278 on the drive rollers of the side conveyors by belts 280 and 282. The shaft 270 also carries a pulley 284 about which is trained the belt 264.

The rear eye ends 286 and 288 of a pair of elongated dividers or arms 290 and 292 are slidably and swingably mounted on the rod 234 and are spaced apart by a central coil spring 296 on the rod 234. The end of the rod 234 carry springs 294 that urge the eye ends 286 and 288 of the arms 290 and 292 toward each other.

The forward ends of the arms 290 and 292 are integrally formed with enlarged guide members or fingers 298 and 300 that extend forwardly past the forward ends of the rolls. The fingers 298 and 300 include rearwardly inclined portions 302 and 304 that extend between and rearwardly pass the forward ends of the rolls.

An arch 306 joins the walls 216 and 218 and supports depending curved swivel rods or hanger members 308 and 310 whose lower ends are attached to the fingers 298 and 300. The upper ends of the rods 308 and 310 are secured to the arch in such a manner as to floatingly support the forward ends of the arms between the gatherer shoes 212 and 214.

The device thus described functions similarly to that of Figures 1–6, inclusive, in that the fingers 298, 300 and arms 290, 292 lift and guide the cotton plants toward the space between the two stripper rolls 242 and 244. The two fingers 298, 300 can move sidewardly relative to each other and are floatingly supported to effectively guide cotton plants, even those leaning or tilted, toward the slot between the two stripper rolls.

Figure 9 shows the swivel rods for the guide arms of the single stripper roll structure of Figures 1–6, inclusive, or the double stripper roll structure of Figures 7, 8 and 9, in slightly modified form. In this embodiment, the side portions of the frame are connected by a cross bar 311 and this cross bar supports universal swivels 312 at the upper ends of the swivel bars 314 whose lower ends are secured to the fingers F of the guide arms A.

Figure 10 shows a single of the guide arms A' supported between a pair of stripper rolls R and R'. The arm A' is mounted on a rear portion of the frame and the fingers F' at the forward end of the arm A' extend upwardly and rearwardly past the forward ends of the rolls R and R' to function similarly to the fingers of the arms previously described.

It should be noted that the forward ends of the rolls 58, 242, 244, R and R' are rotatably supported and preferably slidably supported in bearings suitably secured to the frame. The bearing B shown supporting the forward end of the roll 58 in Figures 1 and 3 is of any suitable type.

Figure 11 illustrates how two rollers of varying length may be incorporated in the present cotton stripping device. One of the stationary stripper frames 400 is formed with a notch 402 in which there is positioned a stripper roller 404 that coacts with a relatively long stripper roll 406 in stripping cotton.

The forward reduced end of the roll 404 is rotatably supported in a bearing 408 mounted by suitable means on the undersurface of the stripper frame 400.

Obviously the ends of the stripper rollers of any embodiment of the present invention may be tapered or straight.

In operation of the present invention, the rolls or rollers accomplish all of the stripping. The throat of the device will be relatively wide although cotton will not pass back therethrough. The device will tend to properly guide rolls of cotton plants into a stripping zone even during night-gathering.

The rod 64 receives the eye portion 1 of an elongated stripper bar 2 that overlies the arm 86 as shown in Figures 1, 4 and 5. The forward offset end 3 of the bar 2 is secured by a pin 4 to the vertical wall of side portion 10 adjacent the forward end portion of member 100. The bar 2 will coact with the arms 88 and 90 in stripping cotton passing therebetween.

Springs 5 of the rod 64 restrict but permit sliding movement of the eye portion 1 on the rod 64.

Having described the invention, what is claimed as new is:

1. In a cotton row stripper including a wheeled frame, a pair of spaced walls forming part of the frame, a pair of ground hugging gatherers on said side walls and a stripping roll mounted between said side walls, means operatively attached to the stripper for lifting and guiding cotton toward the stripping roll comprising an elongated arm having forward and rear portions, means swingably and slidably securing the rear portion of the arm to the frame, said arm being supported alongside of and beneath said roll, a finger on one forward portion of said arm inclining upwardly and rearwardly toward said roll, and supporting means attached to the frame and supporting the forward portion of said arm.

2. In a cotton row stripper including a wheeled frame, a pair of spaced walls forming part of the frame, a pair of ground hugging gatherers on said side walls and a stripping roll mounted between said side walls, means operatively attached to the stripper for lifting and guiding cotton toward the stripping roll comprising an elongated arm having forward and rear portions, means swingably and slidably securing the rear portion of the arm to the frame, said arm being supported alongside of and beneath said roll, a finger on the forward portion of said arm inclining upwardly and rearwardly toward said roll, and a hanger member attached to the forward portion of said arm and swiveled to said frame for supporting the forward portion of the arm.

3. In a cotton row stripper including a vertically inclined stripper roll having a forward end and a frame supporting the stripper roll, means operatively attached to the stripper for lifting and guiding cotton plants toward the stripper roll comprising an elongated arm, means slidably and swingably supporting the arm relative to the stripper roll, and a guide finger extending forwardly past the forward end of the roll and inclining upwardly toward and past the forward end of the roll.

4. In a cotton row stripper including a frame and a pair of spaced parallel stripper rolls supported on the frame for rotation and including forward ends, means for lifting and guiding cotton plants toward the rolls and between the rolls, said means comprising an arm having forward and rear portions, means slidably and swingably supporting the rear portion of the arm on the frame, a finger integrally formed with the forward portion of the arm extending forwardly of the forward ends of the rolls and inclining upwardly and rearwardly past and between the forward ends of the rolls, and a hanger member attached to the frame and secured to the forward portion of the arm for supporting the forward portion of the arm.

5. In a cotton row stripper including a frame and a pair of spaced parallel stripper rolls supported on the frame for rotation and including forward ends, means for lifting and guiding cotton plants toward the rolls and between the rolls, said means comprising an arm having forward and rear portions, means slidably and swingably supporting the rear portion of the arm on the frame, a finger integrally formed with the forward portion of the arm extending forwardly of the forward ends of the rolls and inclining upwardly and rearwardly past and between the forward ends of the rolls, and a curved hanger member having an upper end swiveled to the frame and a lower end secured to the finger.

6. In a cotton row stripper including a frame and a pair of spaced parallel vertically inclined stripper rolls supported for rotation on the frame and having forward ends, a cotton plant lifter and guider comprising a pair of arms located below and between the rolls, means slidably and swingably securing the rear ends of the arms to the frame, a finger on the forward end of each arm, said fingers extending forwardly of the rolls and inclining upwardly between and past the forward ends of the rolls, and means attached to the frame supporting the fingers between the rolls.

7. The combination of claim 6 wherein said last named means includes a pair of curved members having upper ends swiveled to the frame and lower ends secured to the fingers.

8. In a cotton row stripper including a frame and a vertically inclined stripper roll supported by the frame and having a forward end, an arm supported beneath and laterally spaced from the roll, said arm having a rear end slidably and swingably mounted on the frame, and a finger on the forward end of the arm suspended from the frame and extending beyond the forward end of the roll and inclining upwardly and rearwardly past and alongside of the forward end of the roll for guiding and lifting plants toward the roll.

9. In a cotton row stripper including a frame and a vertically inclined stripper roll supported by the frame and having a forward end, a pair of spaced parallel arms having forward and rear ends, means attached to the frame slidably and swingably supporting the arms below the alongside of the roll, and a pair of inclined fingers secured to the forward ends of the arms and supported by the frame, said fingers inclining upwardly past and alongside of the forward end of the roll.

10. The combination of claim 9, wherein one of said fingers extends rearwardly past the other of said fingers.

11. In a cotton row stripper including a frame having a forward arch and a vertically inclined power driven stripper roll supported on the frame and having a forward end, a cotton lifting and guiding device comprising a cross bar mounted on the frame and disposed rearwardly of and transversely of the roll, a pair of spaced parallel arms having rear terminal eyes slidably and swingably mounted on the bar, upwardly and rearwardly inclined fingers on the forward ends of the arms extending alongside of the forward end of the roll, and swivel rods securing the fingers to the arch and supporting the fingers and the forward ends of the arms relative to the roll.

12. In a cotton row stripper including a frame having a forward arch and a vertically inclined power driven stripper roll supported on the frame and having a forward end, a cotton lifting and guiding device comprising a cross bar mounted on the frame and disposed rearwardly of and transversely of the roll, a pair of spaced parallel arms having rear terminal eyes slidably and swingably mounted on the bar, a first upwardly and rearwardly inclined finger on the forward end of one arm, a second upwardly and rearwardly inclined finger on the forward end of the other arm, said first finger being located between the roll and the second finger, said second finger extending rearwardly beyond the first finger, and a swivel rod securing each finger to the arch.

EDD DUGAN.

No references cited.